United States Patent [19]
Konrad

[11] 3,948,536
[45] Apr. 6, 1976

[54] SNOW VEHICLE
[76] Inventor: Reinhard Konrad, Fellengatter 45, A-6820 Frastanz, Austria
[22] Filed: Jan. 21, 1975
[21] Appl. No.: 542,663

[30] Foreign Application Priority Data
Jan. 29, 1974 Austria .................................. 715/74

[52] U.S. Cl. ................................ 280/18; 280/21 R
[51] Int. Cl.² ........................................ B62D 13/06
[58] Field of Search ............ 280/18, 19, 21 R, 12 R, 280/12 B, 11.37 E, 11.37 J, 12 F, 11.13 A

[56] References Cited
UNITED STATES PATENTS
3,098,247  7/1963  Stein ............................... 280/12 F
3,635,490  1/1972  Demareg ............................ 280/18

FOREIGN PATENTS OR APPLICATIONS
5,476      1/1897  Norway ............................ 280/12 F
1,083,029  9/1967  United Kingdom ............... 280/12 B Primary Examiner—Robert R. Song
Attorney, Agent, or Firm—Hans Berman

[57] ABSTRACT

A sledge having a plastic, trough-shaped body consists of two halves releasably joined along a longitudinal, upright median plane. A binding on each half permits limited use of the separated halves like skis on a ski tow. The halves are quickly assembled at the top of the tow for downhill sledding for which they provide a seat and steering brakes.

7 Claims, 9 Drawing Figures

U.S. Patent   April 6, 1976   3,948,536
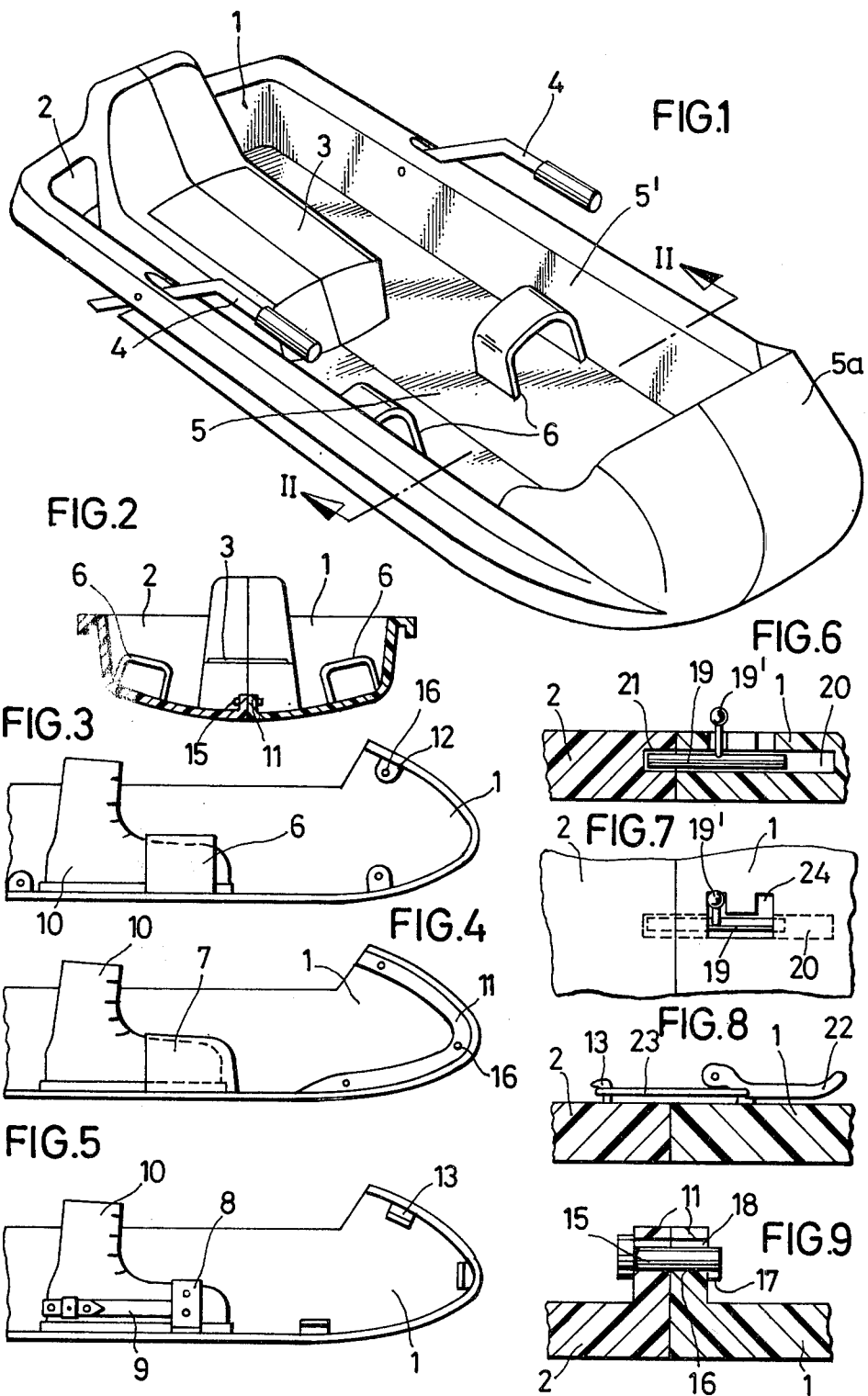

SNOW VEHICLE

This invention relates to downhill sledding, and particularly to a sports vehicle suitable for such sledding.

A sled may be brought to the top of a run by cable car on a truck, but such facilities are not available to the ordinary sledder in most areas. He has to pull the sled up the hill after each downhill run even where a ski tow is available to skiers so that most of a sledder's time on the snow is spent walking uphill.

An object of the invention is the provision of a sled, sleigh, sledge, or like snow vehicle which is capable of being transported uphill together with its user by any mechanical means available to the skier.

The snow vehicle of the invention includes two elongated body portions having respective bottom walls. Each bottom wall has an external bottom face shaped for longitudinal sliding engagement with a snow surface. Means are provided for releasably and fixedly fastening the body portions to one another in a position in which the bottom faces are elongated in a common direction and transversely juxtaposed so that the fastened body portions jointly constitute the body of the vehicle. A binding on each body portion permits a foot of a person to be secured to the body portion, and a seat is permanently attached to at least one body portion.

Other features, additional objects, and many of the attendant advantages of this invention will readily be appreciated as the same becomes better understood from the following description of a preferred embodiment and modifications thereof when considered in connection with the appended drawing in which:

FIG. 1 is a perspective view of a snow vehicle of the invention;

FIG. 2 shows the vehicle of FIG. 1 in fragmentary front-elevational section on the line II—II;

FIG. 3 illustrates the front part of one body portion of the vehicle of FIG. 1 in side elevation;

FIGS. 4 and 5 illustrate respective modifications of the device of FIG. 3;

FIG. 6 shows a concealed portion of the vehicle of FIG. 1 in front-elevational section on a scale much larger than that of FIGS. 1 to 5;

FIG. 7 illustrates the device of FIG. 6 in top plan view;

FIG. 8 shows a modification of the device of FIG. 6 in a corresponding view; and FIG. 9 shows a portion of the apparatus of FIG. 2 in front-elevational section on the scale of FIGS. 6 to 8.

Referring now to the drawing in detail, and initially to FIGS. 1 and 2, there is seen an approximately boat- or trough-shaped vehicle whose body is split along its longitudinal, upright, median plane into two portions 1, 2 which are symmetrical relative to the median plane. Each body portion consists of glass-fiber reinforced plastic and provides one integral half of a seat 3 in the rear of the trough cavity. A brake lever 4 is pivoted to the side of each body portion 1, 2 in such a manner that one lever arm is within convenient reach of a rider seated on the seat 3 for engagement of the other lever arm with a snow surface slidingly engaged by the external bottom faces of the body portions 1, 2.

The bottom wall 5 of the vehicle body is of approximately circularly arcuate configuration. Its concave top face carries two bindings 6 approximately centered between the seat 3 and the front wall 5a of the vehicle body and closely adjacent the side walls 5' of the two body portions. The bindings 6 are unitary plastic parts of the respective body portions and are simple straps of approximate inverted U-shape similar to ancient Norwegian ski bindings.

Upright flanges 11 project from the concave top faces of the two body portions 1, 2 at the abuttingly engaged longitudinal edges, as is best seen in FIGS. 2 and 9, but have been omitted from FIG. 1. Aligned cylindrical bores 16 in the flanges merge with axial grooves 18 and receive headed pins 15. A radial projection 17 on the end of each pin 15 remote from the head is dimensioned to slide in the groove 18 while the pin 15 is being inserted in the bore 16, and the pin is axially secured in the bore when turned 180° into the position shown in FIG. 9 in which the projection 17 is out of alignment with the groove 18.

The rear ends of the body portions 1, 2, obscured by the seat 3 in FIG. 1, are additionally fastened to each other by a latch bolt 19 shown in FIGS. 6 and 7. A transverse bore 20 in the body portion 1 slidably receives the bolt 19 and is partly open in an upward direction so that the bolt handle 19' is accessible for moving the bolt and limits bolt movement to two terminal positions in which it may be tilted into branches 24 of the bore 20. In the operative position of the bolt 19 seen in FIGS. 6 and 7, the bolt 19 projects from the body portion 1 transversely to the common direction of elongation of the two assembled body portions into a recess 21 of the body portion 2 and is secured in the operative position by its handle 19'. It may be similarly secured in a retracted position when the vehicle body is disassembled.

When the user of the vehicle wishes to use a ski tow, he removes the pins 15 and retracts the bolt 19. He then inserts the toe ends of his boots into the binding straps 6 and slides, as on skis, to the bottom station of the ski tow. The bindings adequately secure the two halves of the vehicle body to the user during the uphill ride and may be assembled quickly and without tools for downhill sledding.

Many variations are available in the basic vehicle structure described above and are partly illustrated in FIGS. 3 to 5 and 8. The flanges 11 may be replaced partly or entirely by eyes 12 integrally molded with the body portions 1, 2, and such eyes may be connected by pins 15 of the type shown in FIG. 9. The flanges 11 and the latch 19 may be replaced by hooks 13 cooperating with toggle straps as is shown in FIG. 8. While one body portion carries a hook 13, the other body portion is provided with a toggle lever 22 carrying a rectangular eye 23 of heavy wire shaped and dimensioned to be slipped over an aligned hook 13.

The very simple bindings 6 may be replaced by a molded receptacle 7 open in a rearward direction only to receive the toe portion of a boot 10, as is shown in FIG. 4. A more elaborate binding of another conventional type is shown in FIG. 5 and includes a toe strap 8 attached to each body portion and a heel strap 9 attached to the toe strap.

The simple illustrated fasteners which can be engaged and released without tools or at most require the insertion of a coin edge into a slot in the head of the pin 15 for turning the pin have been found entirely adequate for a vehicle of the type illustrated. The bottom faces of the two body portions 1, 2 are flush with each other, and respective longitudinal edges of the two body portions form a closed seam along practically the entire length of the vehicle. Further stiffness is imparted to the vehicle structure by the external convex shape of the imperforate bottom wall. However, at least some of the advantages of this invention are available in other snow vehicles small enough to be carried along on a ski tow by a single user in the manner described above.

It should be understood, therefore, that the foregoing disclosure relates only to a preferred embodiment of the invention, and that it is intended to cover all changes and modifications in the example of the invention herein chosen for the purpose of the disclosure which do not constitute departures from the spirit and scope of the invention set forth in the appended claims.

What is claimed is:
1. A snow vehicle comprising:
   a. two elongated body portions, each body portion including
      1. a bottom wall having an external bottom face shaped for longitudinal sliding engagement with a snow face, and
      2. a longitudinal side wall projecting from said bottom wall in a direction away from said bottom face;
   b. fastening means for releasably and fixedly fastening said body portions to one another in a position in which said bottom faces are elongated in a common direction and transversely juxtaposed,
      1. the fastened body portions jointly constituting the trough-shaped body of said vehicle,
      2. said bottom walls of said fastened body portions jointly constituting the imperforate bottom of said body;
   c. binding means on said body portions for securing respective feet of a person to said body portions; and
   d. seating means permanently attached to at least one of said body portions and providing a seat on said body.

2. A vehicle as set forth in claim 1, further comprising a brake lever manually operable on each body portion toward and away from a position of engagement with said snow surface.

3. A vehicle as set forth in claim 1, wherein the bottom faces of the fastened body portions are flush with each other.

4. A snow vehicle comprising:
   a. two elongated body portions having respective bottom walls, each bottom wall having an external bottom face shaped for longitudinal sliding engagement with a snow surface;
   b. fastening means for releasably and fixedly fastening said body portions to one another in a position in which said bottom faces are elongated in a common direction and transversely juxtaposed, the fastened body portions jointly constituting the body of said vehicle, said fastening means including:
      1. a bolt movable on one of said body portions transversely to the direction of elongation of said one body portion, the other body portion being formed with a recess adapted to receive said bolt when said body portions are in said position, and
      2. securing means for securing said bolt in an operative position in which said bolt projects beyond said one bottom portion for engagement with said recess against transverse movement into a retracted position spaced from said operative position toward said body portion.

5. A snow vehicle comprising:
   a. two elongated body portions having respective bottom walls, each bottom wall having an external bottom face shaped for longitudinal sliding engagement with a snow surface;
   b. fastening means for releasably and fixedly fastening said body portions to one another in a position in which:
      1. said bottom faces are elongated in a common direction and transversely juxtaposed, the fastened body portions jointly constituting the body of said vehicle,
      2. said bottom faces are flush with each other, and
      3. said body portions have respective longitudinal edges abuttingly engaging each other over substantially the entire length of each body portion;
   c. binding means on said body portions for securing respective feet of a person to said body portions; and
   d. seating means permanently attached to at least one of said body portions and providing a seat on said vehicle.

6. A vehicle as set forth in claim 5, wherein said bottom faces are convexly arcuate substantially about a common longitudinal axis of curvature.

7. A vehicle as set forth in claim 5, wherein said seat is constituted by respective integral, unitary parts of said body portions.

* * * * *